United States Patent [19]

Wald

[11] 4,273,720
[45] Jun. 16, 1981

[54] 2-ARALKOXY-ANTHRAQUINONE DYESTUFFS

[75] Inventor: Roland Wald, Huningue, France

[73] Assignee: Sandoz Ltd., Basel, Switzerland

[21] Appl. No.: 943,339

[22] Filed: Sep. 18, 1978

[30] Foreign Application Priority Data

Sep. 21, 1977 [CH] Switzerland ............... 11550/77
Sep. 21, 1977 [CH] Switzerland ............... 11551/77

[51] Int. Cl.³ .......................................... C07C 143/665
[52] U.S. Cl. ................................. 260/374; 260/380; 8/506; 8/676
[58] Field of Search ................... 8/39, 526, 676; 260/373, 374, 380

[56] References Cited

U.S. PATENT DOCUMENTS

| | | | |
|---|---|---|---|
| 2,580,190 | 12/1951 | Peter et al. | 260/373 |
| 2,992,240 | 7/1961 | Lodge | 260/373 |
| 3,646,071 | 2/1972 | Frey et al. | 260/373 |

*Primary Examiner*—Winston A. Douglas
*Assistant Examiner*—Raymond K. Covington
*Attorney, Agent, or Firm*—Gerald D. Sharkin; Richard E. Vila; Thomas C. Doyle

[57] ABSTRACT

The present invention relates to anionic dyestuffs of the 1-amino-4-aryl- or -4-alkylamino anthraquinone series which are unsubstituted in the 3-position and bear in the 2-position an arylalkyleneoxy group, and in which at least one aryl group bears a sulpho group, with the proviso that when the substituent in the 4-position is alkylamino such alkyl is linear, branched or cyclic and contains at least 9 carbon atoms and the sum of the carbon atoms of the alkylamino group in the 4-position and the alkylene group in the 2-position is at least 12, which dyestuffs are in the free acid or salt form.

16 Claims, No Drawings

2-ARALKOXY-ANTHRAQUINONE DYESTUFFS

The present invention relates to anthraquinone compounds, their production and use as dyestuffs.

More particularly, the present invention provides anionic dyestuffs of the 1-amino-4-aryl- or -4-alkylamino anthraquinone series which are unsubstituted in the 3-position and bear in the 2-position an aralkoxy group, and in which at least one aryl group bears a sulpho group, with the proviso that when the substituent in the 4-position is alkylamino such alkyl is linear, branched or cyclic and contains at least 9 carbon atoms and the sum of the carbon atoms of the alkylamino group in the 4-position and the alkylene group in the 2-position is at least 12, which dyestuffs are in the free acid or salt form.

The 4-arylamino- or -alkylamino groups may be any of those usual in the chemistry of anionic anthraquinone dyestuffs. It will be appreciated that the anthraquinone nucleus itself may also bear (in any of the 5- to 8-positions) further substituents which are common in the chemistry of anionic anthraquinone dyestuffs. However, those dyes in which the anthraquinone nucleus is further unsubstituted are preferred.

The alkyl group which is bound to the amino in the 4-position is preferably R', where R' is a linear, branched or cyclic alkyl containing 9 to 18 carbon atoms whereby any cycloalkyl is preferably cyclohexyl substituted by up to three alkyl groups, more preferably R'', where R'' is a linear, branched or cyclic alkyl containing 9 to 12 carbon atoms, any cycloalkyl preferably being cyclohexyl which is substituted by methyl and/or ethyl. Preferably the carbon atom bound to the amino group in such 4-alkylamino group is a tertiary carbon atom. Most preferably R' is R''', where R''' is 2,6-dimethylheptyl-4 or 3,3,5-trimethylcyclohexyl especially the latter.

The aryl group bound to the amino group in the 4-position is, excluding a possible sulpho substituent, preferably of formula (a),

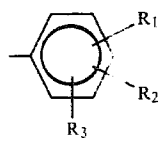

(a)

in which
$R_1$ is hydrogen, hydroxy, halogen, $(C_{1-4})$-alkyl, $(C_{1-4})$alkoxy or mono- or di-$(C_{1-4})$alkylamino,
$R_2$ is hydrogen, halogen or $(C_{1-4})$alkyl, and
$R_3$ is hydrogen, $(C_{1-9})$alkyl, phenyl, phenoxy, halophenoxy or phenyl$(C_{1-3})$alkyl.

By halogen as used herein is meant fluorine, chlorine or bromine.

The preferred halogen is chlorine.

Any alkyl group as $R_1$ and $R_2$ is preferably linear. Preferably any alkyl or alkoxy group as $R_1$ and/or $R_2$ contains 1 to 3 carbon atoms, more preferably any alkyl or alkoxy group contains 1 or 2 carbon atoms, with methyl and methoxy being especially preferred.

Any alkyl group as $R_3$ may be linear or branched. Preferably, any alkyl group as $R_3$ contains from 1 to 4 carbon atoms, more preferably 1 or 2 carbon atoms. The group $R_3$ is preferably in the para-position to the —NH— group.

$R_1$ is preferably $R_1'$, where $R_1'$ is hydrogen, chlorine, $(C_{1-4})$alkyl or $(C_{1-4})$alkoxy. More preferably $R_1$ is $R_1''$, where $R_1''$ is $(C_{1-4})$alkyl. Most preferably $R_1$ is $R_1'''$, where $R_1'''$ is methyl or ethyl, with methyl being especially preferred.

$R_2$ is preferably $R_2'$, where $R_2'$ is hydrogen, chlorine or $(C_{1-4})$alkyl. More preferably $R_2$ is $R_2''$, where $R_2''$ is $(C_{1-4})$-alkyl. Most preferably $R_2$ is $R_2'''$, where $R_2'''$ is methyl or ethyl, with methyl being especially preferred.

$R_3$ is preferably $R_3'$, where $R_3'$ is hydrogen, $(C_{1-4})$-alkyl, phenyl, phenoxy or p-chlorophenoxy. More preferably $R_3$ is $R_3''$, where $R_3''$ is hydrogen or $(C_{1-4})$alkyl. Most preferably $R_3$ is $R_3'''$, where $R_3'''$ is hydrogen, methyl or ethyl.

In the group of formula (a) preferably at least two of $R_1$, $R_2$ and $R_3$ are other than hydrogen. Preferably the group (a) is (a')

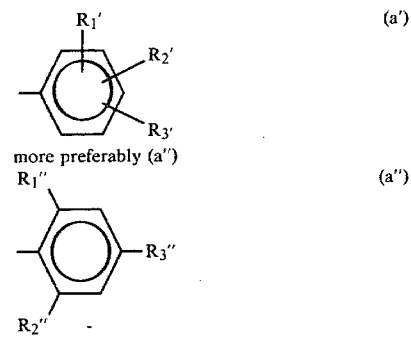

most preferably (a'''), where (a''') is (a'') wherein $R_1''$ is $R_1'''$, $R_2''$ is $R_2'''$ and $R_3''$ is $R_3'''$, with the mesidine radical being especially preferred.

The aralkoxy group, in the sulpho free form, bound to the 2-position of the anthraquinone nucleus is preferably phenalkoxy group in which the alkylene group preferably contains 1 to 5, more preferably 2 to 5 carbon atoms and is straight chain or branched.

Preferred such phenalkoxy groups are those of formulae $b_1$, $b_2$ and $b_3$

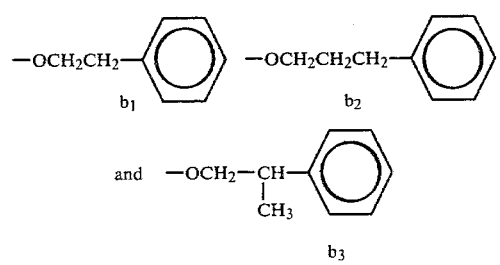

Preferred compounds according to the present invention are those which, in the free acid form, are of formula I,

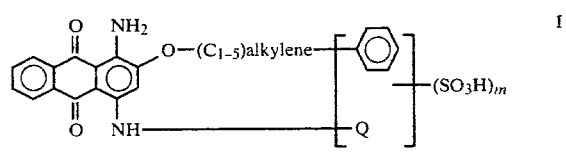

in which

Q is R' or a group of formula (a), and the sum of the carbon atoms in R' and the alkylene group is at least 12, and m is a number from 1 up to the total sum of the benzene rings (excluding the anthraquinone nucleus) in the molecule, and in which the sulpho groups are bound to such benzene rings with the proviso that each benzene ring bears no more than one sulpho group, which compounds are in free acid or salt form.

Representative compounds of formula I are those which, in the free acid form, are of formula Ia or Ib,

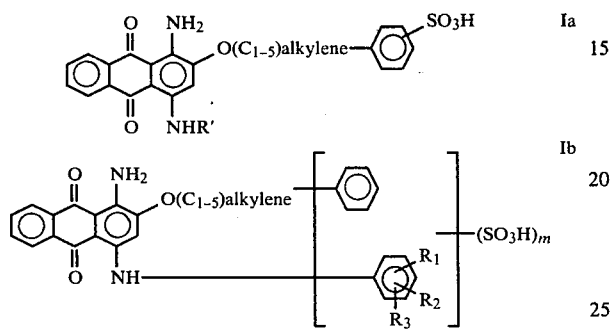

in which m is as defined above, and is preferably 1 to 2.

Preferred compounds of formula Ia are those in which the alkylene group contains 2 to 5 carbon atoms and R' is R". More preferred compounds of formula Ia are those in which the alkylene group is

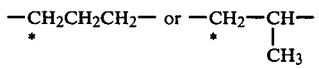

in which
the asterisk indicates which carbon atom is bound to the oxygen,
and R' is R'''.

Preferred compounds of formula Ib are those in which the alkylene group contains 2 to 5 carbon atoms and the 4-position of the anthraquinone nucleus is substituted by a group of formula (a') and in which m is m', where m' is from 1 to 2. Of these, those in which the 4-position is substituted by a group of formula (a") are preferred and such compounds are hereinafter referred to as compounds of formula Ib'.

Even more preferred compounds of formula Ib are those in which the alkylene group is

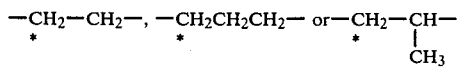

and the 4-position is substituted by a group of formula (a''').

Of the compounds of formulae Ia and Ib, those of formula Ib are preferred, especially those in which the average degree of sulphonation is from 1 to 1.5 sulpho groups.

When dyes according to the invention are in salt form the cation of the salt form of the sulpho group or groups may be any those common in the chemistry of anionic dyes. Preferred cations are alkali metal, especially lithium, sodium or potassium, or ammonium.

The present invention further provides a process for the production of the sulpho-containing anionic dyes of the invention comprising sulphonating the corresponding sulpho-group-free anthraquinones.

Sulphonation may be carried out in accordance with known methods, for example with concentrated sulphuric acid or with oleum. Preferably sulphonation is carried out with 92 to 100% sulphuric acid or with up to 25% oleum, more preferably with 95% sulphuric acid or with up to 10% oleum. Suitable reaction temperatures are from 5° to 50° C., preferably at the lowest possible temperatures, especially at temperatures of from 5° to 30° C., depending on the sulphonation agent and the degree of sulphonation desired. Preferably sulphonation of compounds in which the 4-position of the anthraquinone nucleus is substituted by an arylamino substituent is carried out such that the average degree of sulphonation is from 1 to 1.5 sulpho groups.

The sulphonation products are isolated in accordance with known methods.

Furthermore, the present invention also provides the corresponding sulpho group free anthraquinone compounds as defined above, especially the compounds of formula II

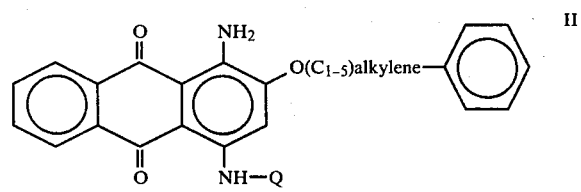

Such sulpho group free anthraquinone compounds may be prepared by reacting the corresponding 1-amino-4-alkyl- or -arylamino substituted-anthraquinone in which the 2-position bears an exchangeable substituent with the corresponding arylalcohol in accordance with known methods.

By exchangeable substituent as used herein is meant those which in the presence of an alcohol can be exchanged with the alkoxy group of the alcohol. Preferred such substituents are halogen, preferably chlorine or bromine, especially bromine or a sulpho group.

The ultimate starting materials for producing the non-sulphonated compounds are known or may be prepared in accordance with known methods from available starting materials.

The dyestuffs according to the present invention are useful for dyeing or printing anionic dyeable textile or non-textile substrates. Representative substrates are paper and leather or textile substrates which consist of or comprise natural or regenerated cellulose, natural or synthetic polyamides, basically modified polypropylene or polyurethane. The textile substrates may be in loose fibre filament, woven or non-woven fabric or yarn form. Preferred substrates are those which consist of or comprise natural or synthetic polyamide, especially wool, silk and nylon. Those dyes which have an average number of from 1 to 1.5 sulpho groups are especially suitable for dyeing synthetic polyamides from a weakly acid to neutral dyebath.

Dyeing and printing may be carried out in accordance with known methods, for example by the padding, printing or exhaust processes, especially the latter.

Brilliant dyeings and printings obtained exhibit notable wet- (especially water-, wash-, milling- and sweat-) fastnesses, lightfastness, rubbing fastness and fastness to ozone.

The dyes are resistant to hard water and give dyeings of violet, blue-violet and red-violet shades. The dyestuffs of formula Ib give the preferred dyeings of red-violet shades.

The following Examples further serve to illustrate the invention. In the Examples all parts are by weight and all temperatures are in degrees Centigrade.

EXAMPLE 1a 12 parts of potassium hydroxide are dissolved at 80° to 90° in 100 parts of 2-phenylethanol, and 21.8 parts of 1-amino-4-(2',4',6'-trimethylphenylamino)-anthraquinone-2-sulphonic acid are then added. The entire mixture is stirred for 3 hours at 90° to 95°, then poured into 300 parts of ethanol, the separated product is filtered off, washed until neutral with water, and dried.

15 parts of the dyestuff base are stirred at 8° to 10° into 60 parts of 5% oleum until a sample has become completely soluble in water. The mixture is then poured into a mixture consisting of 150 parts of water and 150 parts of ice. The dyestuff, which in free acid form is of formula

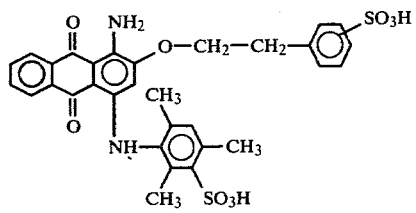

precipitates. It is filtered, and washed with a 12% sodium chloride solution. The dyestuff is made into a paste with water and set at a pH value of 7 using caustic soda, and it is then dried. Textile substrates of polyamides, e.g. nylon and wool, are dyed from a slightly acidic bath in pure reddish-violet shades which are wet- and light-fast.

EXAMPLE 1b 15 parts of the unsulphonated dyestuff of Example 1a are dissolved in 80 parts 95% sulphuric acid at 18° to 22° and are stirred until completely soluble in water. The mixture is then poured onto ice, and the resultant precipitated dyestuff, which in the free acid form is of formula

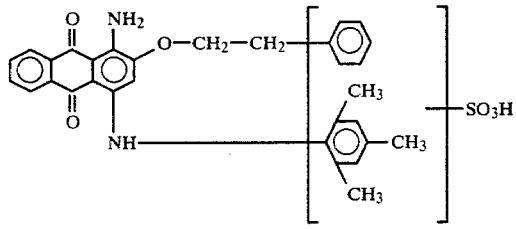

is filtered off. The residue is washed with a 12% sodium chloride solution. The dyestuff is made into a paste with water, adjusted to pH 7 with caustic soda and dried. A red-violet dye is obtained which gives dyeings on natural and synthetic polymides with notable light- and wet-fastnesses.

EXAMPLE 1c 20 parts 1-amino-2-(2'-phenylethoxy)-4-(2',4',6'-trimethylphenylamino)-anthraquinone are dissolved in 80 parts 100% sulphuric acid and stirred at 18° to 22° for about 4 hours until the degree of sulphonation reaches 1.2 to 1.3. The product which is isolated in conventional manner gives red-violet dyeings on polyamide textile substrates which have notable wet-fastnesses. The dyestuff has good water solubility, resistance to salts and hard water.

EXAMPLE 2a

If following the procedure of Example 1a but employing the same amount of 1-amino-2-(3'-phenylpropoxy)-4-(2''-4''-6''-trimethylphenylamino)-anthraquinone a disulphonated dye which dyes natural and synthetic polyamide textile substrates in red-violet shades is obtained.

EXAMPLE 2b

Following the procedure of Example 1b, but employing the same amount of the unsulphonated dye given in Example 2a a dye in which the degree of sulphonation is 1 and which dyes polyamides in red-violet shades is obtained.

EXAMPLE 2c

Following the procedure of Example 1c, but employing the same amount of the unsulphonated dye given in Example 2b a dye in the degree of sulphonation is 1.2 to 1.3 and which dyes polyamides in red-violet shades is obtained.

EXAMPLES 3a to 3c

Following the procedure of Examples 2a to 2c but employing the same amount of 1-amino-2-(2'-phenylpropoxy)-4-(2'',4'',6''-trimethylphenylamino)-anthraquinone a disulphonated dyestuff (Example 3a), a mono-sulphonated dye which is analogous to that of Example 1b (Example 3b) and a dye in which the degree of sulphonation is 1.2 to 1.3 (Example 3c) are obtained which dye polyamides in red-violet shades.

EXAMPLE 4

A mixture consisting of 150 parts 2-phenylethanol, 14 parts potassium hydroxide and 18 parts 1-amino-2-bromo-4-(4'-n-butylphenylamino)-anthraquinone is stirred at 100° for 8 hours. The reaction mixture is then diluted with 200 parts ethanol and the precipitated compound of formula VII

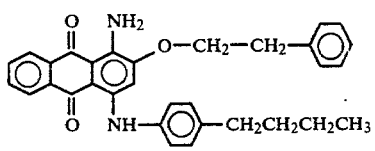

is filtered, washed pure with ethanol and dried at 100°. 10 parts of the dye are dissolved in 50 parts 100% sulphuric acid at 15° to 20° and stirred until completely soluble. The product is added to ice and the precipitated product, which in the free acid form is of formula

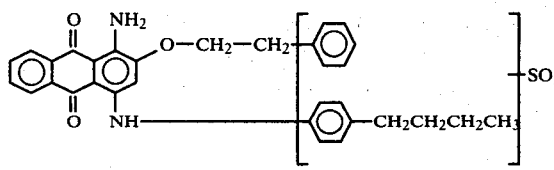

is filtered. The residue is washed with a 10% sodium chloride solution and dried. A violet powder which gives dyeings on nylon and wool of violet shades having notable light- and wet-fastnesses is obtained.

EXAMPLE 5

Following the procedure of Example 4, but employing instead of 2-phenylethanol, the same amount of 3-phenylethanol the corresponding sulphonated dyestuff is obtained which dyes wool and nylon in violet shades.

EXAMPLE 6

Following the procedure of Example 4, but employing instead of the dyestuff of formula VII, the same amount of 1-amino-2-(2'-phenylpropoxy)-4-(4''-n-butylphenyl)-anthraquinone the corresponding monosulphonated dye which dyes wool and nylon in violet shades is obtained.

In the following Table further dyes which may be prepared in analogy to the procedure described in Examples 1a, 1b, 1c and 4 and which correspond, in the free acid form, to formula

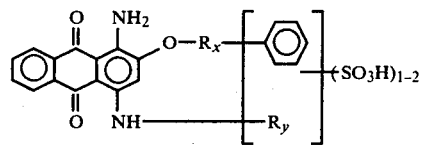

are given.

TABLE

| Example No. | $-O-R_x-$ | $R_y$ | Dye-Shade on wool and nylon |
|---|---|---|---|
| 7 | $-O-CH_2-CH_2-$ | –⌬ | violet |
| 8 | " | –⌬-Cl | " |
| 9 | " | –⌬(Cl,Cl) | " |
| 10 | " | –⌬(Cl)...Cl | " |
| 11 | " | –⌬-CH₃ | " |
| 12 | " | –⌬-CH₃ | " |
| 13 | " | –⌬(CH₃)-CH₃ | " |
| 14 | " | –⌬(CH₃,CH₃) | red-violet |
| 15 | " | –⌬(CH₃)-CH₃ | violet |
| 16 | " | –⌬(CH₃,CH₃) | " |
| 17 | " | –⌬(CH₃)...CH₃ | " |

TABLE-continued

| Example No. | —O—R$_x$— | R$_y$ | Dye-Shade on wool and nylon |
|---|---|---|---|
| 18 | " | 2,4-dimethylphenyl (CH₃ at top and bottom of phenyl ring) | " |
| 19 | " | 4-methylphenyl | " |
| 20 | " | 2,4-diethylphenyl | " |
| 21 | " | 2,6-diethylphenyl | red-violet |
| 22 | " | 2,6-diethyl-4-methylphenyl | " |
| 23 | " | 4-ethoxyphenyl | violet |
| 24 | " | 2-methoxy-4-methylphenyl | " |
| 25 | " | 4-phenoxyphenyl | " |
| 26 | " | 4-(4-chlorophenoxy)phenyl | " |
| 27 to 46 | —O—CH₂—CH₂—CH₂— | | as in Examples 7 to 26 |
| 47 to 66 | —O—CH₂—CH(CH₃)— | | as in Examples 7 to 26 |

EXAMPLE 67

15 parts potassium hydroxide are dissolved at 90° in 100 parts 3-phenylpropanol and 30 parts 1-amino-4-(3',3',5'-trimethylcyclohexylamino)-anthraquinone-2-sulphonic acid. After stirring for 4 hours, the reaction mixture is poured onto 300 parts methanol. The dye of formula

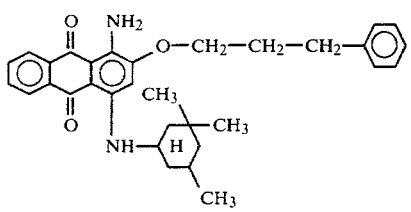

which crystallises out is filtered, washed with methylalcohol and water and dried at 100°.

10 parts of the dye of formula X are dissolved in 40 parts 100% sulphuric acid at 12° to 15°. After 1 hour sulphanation is complete, the product is poured onto a mixture of 100 parts water and 100 parts ice. The precipitated dyestuff which in free acid form is of formula

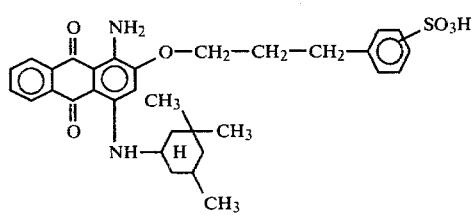

is washed with a 7% sodium chloride solution and made into a paste with water, adjusted to pH 7 with caustic soda and dried. The dyestuff dyes wool and nylon from a weakly acid bath in pure blue-violet shades with notable light- and wet-fastnesses.

EXAMPLE 68

8 parts potassium hydroxide and 12 parts 1-amino-2-bromo-4-(2',6'-dimethylheptyl-4'-amino)-anthraquinone are dissolved at 75° to 80° in 60 parts 3-phenylpropanol. After 5 hours 3-phenylpropanol is removed with wet steam and the dyestuff is recrystallised from methanol and dried. 10 parts of the dye are dissolved in 60 parts 95% sulphuric acid at 20° to 25° and stirred until completely soluble. The reaction mixture is poured onto an ice/water mixture whereupon the dye, which in the free acid form is of formula

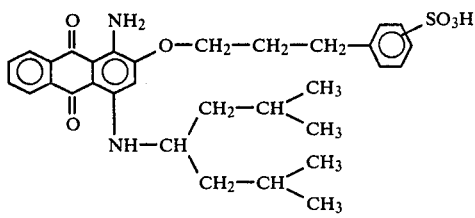

is precipitated, filtered, washed with a 10% sodium chloride solution and dried at 100°. The dye gives brilliant blue-violet dyeings on polyamide fibres which have notable light- and wet-fastnesses.

EXAMPLE 69

Following the procedure of Example 67, but using instead of 3-phenylpropanol, the same amount of 2-phenylpropanol, the corresponding monosulphonated dye which dyes wool and nylon in blue-violet shades, is obtained.

EXAMPLE 70

Following the procedure of Example 68 but employing, instead of 3-phenylpropanol, the same amount of 2-phenylpropanol, the corresponding monosulphonated dye is obtained which dyes nylon and wool in blue-violet shades.

In the above Examples 1 to 70, the dyestuffs owing to the preparation and isolation procedure employed are obtained in the sodium salt form. However, when another base is employed for neutralization, e.g. lithium-, potassium- or ammonium-hydroxide, the corresponding lithium-, potassium- or ammonium salts are obtained.

APPLICATION EXAMPLE 1 part of the dye of Example 1a is dissolved in 6000 parts water at 40° and 4 parts ammonium sulphate are added thereto. 100 parts of nylon 66 yarn entered into the dyebath which is then heated to boiling temperature over a period of 30 minutes and dyeing is effected for 1 hour at the boil. The fabric is subsequently removed, rinsed and dried and a red-violet dyeing is obtained.

Wool may also be dyed in accordance with the above method.

The dyestuffs of Examples 1b, 1c or 2 to 66 may also be used to dye nylon 66 or wool in accordance with the above procedure.

What is claimed is:

1. A 1-amino-4-arylamino anthraquinone dyestuff which is unsubstituted in the 3-position and bears in the 2-position an aralkoxy group, and in which at least one aryl group bears a sulpho group, which dyestuff is in free acid or salt form.

2. A dyestuff according to claim 1, in which any 4-arylamino group, excluding a possible sulpho substituent, is of formula

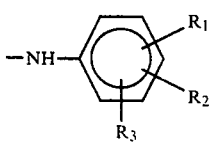

in which
R$_1$ is hydrogen, hydroxy, halogen, (C$_{1-4}$)-alkyl, (C$_{1-4}$)alkoxy or mono- or di(C$_{1-4}$)alkylamino,
R$_2$ is hydrogen, halogen or (C$_{1-4}$)alkyl, and
R$_3$ is hydrogen, (C$_{1-9}$)alkyl, phenyl, phenoxy, halophenoxy or phenyl(C$_{1-3}$)alkyl.

3. A dyestuff according to claim 2, in which R$_1$ is R$_1'$, where R$_1'$ is hydrogen, chlorine, (C$_{1-4}$)alkyl or (C$_{1-4}$)alkoxy.

4. A dyestuff according to claim 2, in which R$_2$ is R$_2'$, where R$_2'$ is hydrogen, chlorine or (C$_{1-4}$)alkyl.

5. A dyestuff according to claim 2, in which R$_3$ is R$_3'$, where R$_3'$ is hydrogen, (C$_{1-4}$)alkyl, phenyl, phenoxy or p-chlorophenoxy.

6. A dyestuff according to claim 2, in which R$_1$ is R$_1''$, where R$_1''$ is (C$_{1-4}$)alkyl, R$_2$ is R$_2''$, where R$_2''$ is (C$_{1-4}$)alkyl, and R$_3$ is R$_3''$, where R$_3''$ is hydrogen or (C$_{1-4}$)alkyl.

7. A dyestuff according to claim 2, in which R$_1$ is methyl or ethyl, R$_2$ is methyl or ethyl and R$_3$ is hydrogen, methyl or ethyl.

8. A dyestuff according to claim 2, in which the 2-aralkoxy group is phenyl(C$_{1-5}$)alkoxy.

9. A compound which in the free acid form, is of formula I,

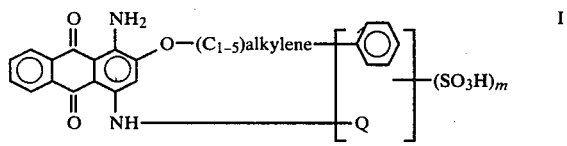

in which Q is a group (a)

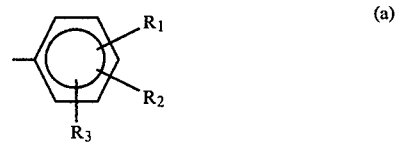

in which
R$_1$ is hydrogen, hydroxy, halogen, (C$_{1-4}$)alkyl, (C$_{1-4}$)alkoxy or mono- or di(C$_{1-4}$)alkylamino,
R$_2$ is hydrogen, halogen or (C$_{1-4}$)alkyl, and
R$_3$ is hydrogen, (C$_{1-9}$)alkyl, phenyl, phenoxy, halophenoxy or phenyl(C$_{1-3}$)alkyl,
and m is a number from 1 up to the total sum of the benzene rings, excluding the anthraquinone nucleus, in the molecule,
and in which the sulpho groups are bound to such benzene rings with the proviso that each benzene ring bears no more than one sulpho group, which compound is in free acid or salt form.

10. A dyestuff according to claim 1 in which the alkylene portion of the 2-aralkoxy group is

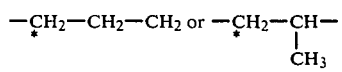

in which the asterisk indicates which carbon atom is bound to the oxygen.

11. A compound according to claim 9, in which m is from 1 to 2.

12. A compound according to claim 9, in which Q is a group of formula (a')

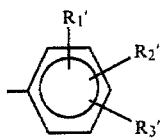
(a')

in which $R_1'$ is hydrogen, chlorine, $(C_{1-4})$alkyl or $(C_{1-4})$alkoxy, $R_2'$ is hydrogen, chlorine or $(C_{1-4})$alkyl, $R_3'$ is hydrogen, $(C_{1-4})$alkyl, phenyl, phenoxy or p-chlorophenoxy, and the alkylene group contains from 2 to 5 carbon atoms.

13. A compound according to claim 12, in which (a') is (a'')

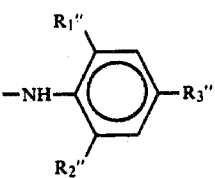
(a'')

in which
  $R_1''$ is $(C_{1-4})$alkyl,
  $R_2''$ is $(C_{1-4})$alkyl,
  $R_3''$ is hydrogen or $(C_{1-4})$alkyl.

14. A compound according to claim 9, in which the alkylene group is

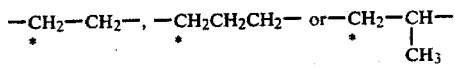

in which the asterisk indicates which carbon atom is bound to the oxygen.

15. A compound according to claim 9, in which the average degree of sulphonation is from 1 to 1.5 sulpho groups per molecule.

16. A 1-amino-4-arylamino anthraquinone compound free from sulpho groups, in which the 3-position is unsubstituted and the 2-position bears an aralkoxy group.

* * * * *